(12) United States Patent
Fukuda et al.

(10) Patent No.: US 10,286,499 B2
(45) Date of Patent: May 14, 2019

(54) NI BASED ALLOY FLUX CORED WIRE (71) Applicant: Kobe Steel, Ltd., Kobe-shi (JP)

(72) Inventors: Kazuhiro Fukuda, Fujisawa (JP); Masaki Shimamoto, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 862 days.

(21) Appl. No.: 14/511,568

(22) Filed: Oct. 10, 2014

(65) Prior Publication Data

US 2015/0114944 A1  Apr. 30, 2015

(30) Foreign Application Priority Data

Oct. 31, 2013 (JP) .................................. 2013-227171

(51) Int. Cl.

| | | |
|---|---|---|
| *B23K 35/30* | (2006.01) | |
| *B23K 35/02* | (2006.01) | |
| *B23K 35/362* | (2006.01) | |
| *B23K 35/36* | (2006.01) | |
| *B23K 35/365* | (2006.01) | |
| *B23K 35/368* | (2006.01) | |
| *B23K 35/40* | (2006.01) | |
| *C22C 19/05* | (2006.01) | |

(52) U.S. Cl.
CPC ...... *B23K 35/3033* (2013.01); *B23K 35/0266* (2013.01); *B23K 35/362* (2013.01); *B23K 35/365* (2013.01); *B23K 35/3607* (2013.01); *B23K 35/3608* (2013.01); *B23K 35/368* (2013.01); *B23K 35/406* (2013.01); *C22C 19/056* (2013.01); *C22C 19/057* (2013.01)

(58) Field of Classification Search
CPC .. B23K 35/30; B23K 35/308; B23K 35/3066; B23K 35/36; B23K 35/3602; B23K 35/3605
USPC .......................................... 219/145.1, 145.22
See application file for complete search history.

(56) References Cited

U.S. PATENT DOCUMENTS

| | | | | |
|---|---|---|---|---|
| 4,149,063 | A * | 4/1979 | Bishel | B23K 35/304 219/137 WM |
| 6,940,042 | B2 * | 9/2005 | Hara | B23K 35/3053 219/145.22 |
| 2002/0153364 | A1 * | 10/2002 | North | B23K 9/0213 219/137 PS |
| 2006/0165552 | A1 * | 7/2006 | Kapoor | B23K 35/0261 420/70 |

(Continued)

FOREIGN PATENT DOCUMENTS

| | | |
|---|---|---|
| JP | 60-46896 | 3/1985 |
| JP | 05261593 A * | 10/1993 |

(Continued)

*Primary Examiner* — Dana Ross
*Assistant Examiner* — Ayub A Maye
(74) *Attorney, Agent, or Firm* — Oblon, McClelland, Maier & Neustadt, L.L.P.

(57) ABSTRACT

A Ni based alloy flux cored wire including a Ni based alloy as a sheath is provided, wherein the sheath contains predetermined ranges of Ni, Cr, Mo, Ti, Al, and Mg relative to the total mass of the sheath, control is made to ensure predetermined C and Si, the composition of the whole wire, which is the sum total of the sheath components and flux components enveloped in the sheath, contains predetermined ranges of Ni, Cr, Mo, Mn, W, Fe, Ti, Al, and Mg relative to the total mass of the wire, and control is made to ensure predetermined C, Si, Nb, P, and S.

11 Claims, 1 Drawing Sheet

(56) References Cited

U.S. PATENT DOCUMENTS

| | | | |
|---|---|---|---|
| 2006/0255026 A1* | 11/2006 | North | B23K 35/368 219/137 WM |
| 2009/0261085 A1* | 10/2009 | Suzuki | B23K 9/173 219/137 PS |
| 2011/0171485 A1* | 7/2011 | Kawamoto | B23K 35/0266 428/576 |
| 2012/0055903 A1* | 3/2012 | Izutani | B23K 9/04 219/74 |

FOREIGN PATENT DOCUMENTS

| | | | |
|---|---|---|---|
| JP | 06155079 A | * | 6/1994 |
| JP | 11-138293 A | | 5/1999 |
| JP | 2005-59077 | | 3/2005 |
| JP | 2007-203350 | | 8/2007 |

\* cited by examiner

NI BASED ALLOY FLUX CORED WIRE

CROSS REFERENCE TO RELATED APPLICATIONS

The present application claims the benefit of the filing date of Japanese application no. 2013-227171, filed on Oct. 31, 2013, the text of which is incorporated by reference.

BACKGROUND OF THE INVENTION

1. Field of the Invention

The present invention relates to a Ni based alloy flux cored wire which is used in welding of 9% Ni steel, various high Ni alloys, and the like.

2. Description of the Related Art

A welding material containing a Ni based alloy as a component is used in welding of, for example, a 9% Ni steel which is representative of low temperature service steels. The 9% Ni steel and the like are widely used for storage tanks and the like of, for example, LNG, liquid nitrogen, and liquid oxygen. In welding of the 9% Ni steel, in order to ensure the toughness, which is equivalent to that of the base material, of a weld zone at a cryogenic temperature of −196° C., a Ni based alloy welding material, rather than a welding wire containing a component similar to the 9% Ni steel having a ferrite microstructure (so-called matching composition wire), is used for a weld joint in general. This is because in the case where welding is performed by using the matching composition wire, the weld joint on an "as welded" basis may not ensure the strength and low-temperature toughness equivalent to those of the 9% Ni steel.

In recent years, in the case of specific welding materials, e.g., Ni based alloys, as well, gas-shielded metal arc welding by using a Ni based alloy flux cored wire has been expanded, where a higher operation efficiency is expected as compared with those in manual metal-arc welding and TIG welding. On the other hand, the Ni based alloy has a complete austenite microstructure and high hot cracking susceptibility and, therefore, it is difficult to ensure the compatibility between the hot cracking resistance and the welding operability, so that there are limitations to the welding position and the welding condition applicability. Then, as for the Ni based alloy flux cored wire, various studies have been made to improve the hot cracking resistance for the purpose of expansion of this applicability.

For example, in Japanese Unexamined Patent Application Publication No. 2005-59077 and Japanese Unexamined Patent Application Publication No. 2007-203350, reduction in the hot cracking susceptibility is intended by optimizing the wire components and deposit metal chemical components of the Ni based alloy flux cored wire, that is, by reducing contents of Cr and Nb which adversely affect the hot cracking resistance and ensuring deposit metal chemical components primarily composed of a Ni—Mo alloy system. For example, in Japanese Unexamined Patent Application Publication No. 60-46896, reduction of blowholes in the Ni based composite wire for welding of a low temperature service steel is intended by adding Ti, Al, Zr, and Mg to a flux, so as to facilitate deoxidation reaction of a molten metal and reducing a CO gas reaction.

As for each of the wires described in Japanese Unexamined Patent Application Publication Nos. 2005-59077 and 2007-203350, ensuring of the compatibility between an improvement in the hot cracking resistance and the all position welding operability is intended, but there is room for improvement in the porosity defect resistance (blowhole resistance).

Meanwhile, as for the wire described in Japanese Unexamined Patent Application Publication No. 60-46896, the deoxidizing components are added to the flux. Even when the deoxidizing components are added to the flux, most of the deoxidizing components in the flux are oxidized during welding before the deoxidation reaction of the molten metal is induced and are discharged as slag. Consequently, there is a problem that the effect of deoxidizing the molten metal is low. In this regard, it is necessary that large amounts of deoxidizing components be added to the flux to sufficiently obtain the effect of deoxidizing the molten metal, and there is a problem that the welding operability is degraded because of an increase in spatter by addition of large amounts of deoxidizing components. Consequently, development of the Ni based alloy flux cored wire has been desired, where the compatibility between the all position welding operability and the porosity defect resistance is ensured.

SUMMARY OF THE INVENTION

Accordingly, it is an issue of the present invention to provide a Ni based alloy flux cored wire, where in welding of a 9% Ni steel or a Ni based alloy, the all position welding operability is excellent and, in addition, a weld metal exhibiting excellent porosity defect resistance is obtained.

For the purpose of reducing blowholes which have caused a problem in an all position Ni based alloy flux cored wire of Ni—Mo alloy system, where contents of Cr and Nb are regulated to low levels from the viewpoint of the hot cracking resistance, the present inventors found the following facts.

The equilibrium solubilities of C and O elements in a Ni based alloy molten metal are very low as compared with those in a common carbon steel. Therefore, when the molten metal is solidified in welding, the equilibrium solubilities of C and O elements are reduced because of lowering of the temperature and, thereby, blowholes tend to be generated on the basis of a CO gas generation reaction. In particular, the equilibrium solubilities of C and O elements of a Ni—Mo based alloy having small contents of Cr and Nb are lower than those of a Ni—Cr—Nb based alloy. Consequently, in the case where the C content in the wire is large, blowholes tend to be generated easily on the basis of generation of a CO gas.

The solidification start temperature of a molten metal of an Fe based welding material typified by a carbon steel or a stainless steel is 1,450° C. to 1,500° C., whereas the solidification start temperature of a molten metal of a Ni based alloy welding material is a relatively low 1,300° C. to 1,400° C. Therefore, the Ni based alloy welding material tends to exhibit a long time lag between completion of solidification and formation of a molten slag on the molten metal surface and start of solidification of the molten metal. Furthermore, in an all position slag system which can be welded at vertical position, there is a large difference between the temperature at which solidification of the molten slag is completed and the temperature at which solidification of the molten metal is started. As described above, solidification of the molten slag is fast, so that the time for releasing a CO gas from the molten metal is short before the solidification of the molten slag is completed. Consequently, in particular, an all position Ni based alloy flux cored wire has a problem that a CO gas is trapped in the molten metal and blowholes are generated easily.

As described above, in the Ni based alloy exhibiting very low equilibrium solubilities of C and O elements as compared with those of the carbon steel, a CO gas is generated in the molten metal during welding easily. Therefore, it is necessary that deoxidation be performed more effectively when a very short-time metallurgical reaction is induced during welding. Then, it was found that a good weld metal was able to be obtained, where an amount of generation of blowholes was very small, by regulating the content of C in the sheath and the whole wire to low levels and adding Al, Ti, and Mg deoxidizing components in the sheath.

In order to solve the above-described issues, the following technical measures are taken in the present invention.

A Ni based alloy flux cored wire according to the present invention includes a Ni based alloy as a sheath, wherein the composition of the above-described sheath relative to the total mass of the sheath is within the range of Ni: 60 to 80 percent by mass, Cr: 1 to 15 percent by mass, Mo: 8 to 22 percent by mass, Ti: 0.002 to 0.40 percent by mass, Al: 0.03 to 0.40 percent by mass, and Mg: 0.004 to 0.025 percent by mass, where control is made to ensure C: 0.020 percent by mass or less and Si: 0.15 percent by mass or less, the composition of the whole wire, which is the sum total of the above-described sheath components and flux components enveloped in the above-described sheath, relative to the total mass of the wire, is within the range of Ni: 53 to 75 percent by mass, Cr: 1 to 15 percent by mass, Mo: 10 to 20 percent by mass, Mn: 1.5 to 5.5 percent by mass, W: 1.5 to 5.0 percent by mass, Fe: 2.0 to 8.0 percent by mass, Ti: 0.002 to 0.50 percent by mass, Al: 0.02 to 0.50 percent by mass, and Mg: 0.003 to 0.03 percent by mass, where control is made to ensure C: 0.050 percent by mass or less, Si: 0.20 percent by mass or less, Nb: 0.030 percent by mass or less, P: 0.015 percent by mass or less, and S: 0.010 percent by mass or less.

According to such a configuration, in the Ni based alloy flux cored wire (hereafter referred to as flux cored wire or simply wire appropriately), a Ni based alloy is used as a sheath metal and, thereby, the homogeneity of the weld metal is not impaired nor is the flux filled excessively. Meanwhile, addition of predetermined amounts of Cr and Mo to the sheath of the flux cored wire improves the corrosion resistance and the strength of the weld metal. Also, addition of predetermined amounts of Ti, Al, and Mg to the sheath of the flux cored wire reduces the amount of dissolved oxygen in the molten metal in a very short time, so that a sufficient deoxidation effect is obtained even when the amount of addition is very small, as compared with the case where the deoxidizing components are added to the flux. Consequently, blowholes can be reduced without impairing the welding operability. Control of the C content in the sheath of the flux cored wire to a predetermined amount or less reduces the CO gas reaction in the molten metal, so that the amount of generation of blowholes is reduced. Control of the Si content in the sheath of the flux cored wire to a predetermined amount or less suppresses generation of low-melting point compounds, so that degradation in the hot cracking resistance is suppressed.

Furthermore, according to such a configuration, in the case where predetermined amounts of Ni, Cr, Mo, and W relative to the total mass of the wire are added to the composition of the whole flux cored wire, the mechanical performance, the corrosion resistance, and the strength of the weld metal are improved. In the case where a predetermined amount of Mn relative to the total mass of the wire is added to the flux cored wire, Mn is bonded to S to make S harmless, so that degradation in the hot cracking resistance is suppressed. In the case where a predetermined amount of Fe relative to the total mass of the wire is added to the flux cored wire, the ductility of the weld metal is ensured. In the case where predetermined amounts of Ti, Al, and Mg relative to the total mass of the wire are added to the flux cored wire, the amount of dissolved oxygen in the molten metal is reduced in a very short time, so that a sufficient deoxidation effect is obtained. In the case where the C content relative to the total mass of the flux cored wire is controlled to a predetermined amount or less, the CO gas reaction in the molten metal is suppressed, so that the amount of generation of blowholes is reduced. Suppression of CO gas generation in itself can obtain a good weld metal including reduced blowholes even in the all position slag system, where the solidification temperature of the slag is high. In the case where the Si, Nb, P, and S contents relative to the total mass of the flux cored wire are controlled to predetermined amounts or less, generation of low-melting point compounds is suppressed, so that degradation in the hot cracking resistance is suppressed.

In the Ni based alloy flux cored wire according to the present invention, preferably, the ratio calculated by $[C]/([Ti]+[Al]+[Mg]\times 3)$ is 0.11 or less, where percent by mass of C, Ti, Al, and Mg contained in the above-described sheath are represented by [C], [Ti], [Al], and [Mg], respectively.

According to such a configuration, the amount of generation of blowholes in the flux cored wire is further reduced.

In the Ni based alloy flux cored wire according to the present invention, preferably, the flux enveloped in the above-described sheath contains the sum total of at least two types selected from the group consisting of $TiO_2$, $SiO_2$, and $ZrO_2$: 3 to 15 percent by mass, the sum total of compounds of Na, K, and Li (the sum total in terms of Na, K, and Li simple substances): 0.1 to 1.0 percent by mass, and incidental impurities relative to the total mass of the wire.

According to such a configuration, in the case where the sum total of at least two types selected from the group consisting of $TiO_2$, $SiO_2$, and $ZrO_2$ in the flux included in the flux cored wire is specified relative to the total mass of the wire, the arc stability is improved and the bead shape is made fine, so that a weld metal having excellent bead appearance is obtained.

In the case where the contents of compounds of Na, K, and Li (the sum total in terms of Na, K, and Li simple substances) in the flux included in the flux cored wire is specified, generation of spatters is suppressed relative to the total mass of the wire.

DESCRIPTION OF THE PREFERRED EMBODIMENTS

The embodiments according to the present invention will be described below in detail.

A flux cored wire according to the present invention includes a Ni based alloy as a sheath. The composition of the sheath contains predetermined ranges of amounts of Ni, Cr, Mo, Ti, Al, and Mg relative to the total mass of the sheath, where C and S are controlled to predetermined amounts or less.

The composition of the whole wire, which is the sum total of the sheath components and flux components enveloped in the sheath, contains predetermined ranges of amounts of Ni, Cr, Mo, Mn, W, Fe, Ti, Al, and Mg relative to the total mass of the wire, and C, Si, Nb, P, and S are controlled to predetermined amounts or less.

In the flux cored wire, preferably, the ratio calculated by [C]/([Ti]+[Al]+[Mg]×3) is specified to be 0.11 or less, where percent by mass of C, Ti, Al, and Mg contained in the sheath are represented by [C], [Ti], [Al], and [Mg], respectively.

In the flux cored wire, preferably, the flux enveloped in the sheath contains the sum total of at least two types selected from the group consisting of $TiO_2$, $SiO_2$, and $ZrO_2$: 3 to 15 percent by mass, the sum total of compounds of Na, K, and Li (the sum total in terms of Na, K, and Li simple substances): 0.1 to 1.0 percent by mass, and incidental impurities relative to the total mass of the wire.

The reasons for the limitations of the components of the flux cored wire will be described below.

The reasons for the limitations of the component numerical values of the sheath will be described below.

Ni: 60 to 80 percent by mass in sheath

The Ni based alloy is used as the sheath metal for the purpose of not impairing the homogeneity of the weld metal and suppressing addition of the alloy to the flux in order to avoid the flux from being excessively filled. If the Ni content in the Ni based alloy is less than 60 percent by mass, the contents of other elements increase inevitably, although elements, e.g., Cr and Mo, other than Ni in the sheath degrade the drawability of the sheath, and the productivity is degraded. On the other hand, if the Ni content is more than 80 percent by mass, most of the other alloy elements are added to the flux and, thereby, the flux filling ratio (the ratio of the mass of flux to the total mass of flux cored wire) becomes excessive. If the flux filling ratio becomes excessive, drawing of the wire becomes difficult in the production process and the productivity is degraded. Therefore, the Ni content in the sheath is specified to be 60 to 80 percent by mass.

Cr: 1 to 15 percent by mass in sheath

Chromium has an effect of improving the corrosion resistance and the strength of the weld metal. In order to obtain the above-described effect, the Cr content in the sheath is specified to be 1 percent by mass or more. On the other hand, if the Cr content in the sheath is more than 15 percent by mass, the hot workability of the metal sheath is degraded and forming of the sheath becomes difficult. Therefore, the Cr content in the sheath is specified to be 1 to 15 percent by mass.

Mo: 8 to 22 percent by mass in sheath

Molybdenum is an element indispensable for ensuring the strength of the weld metal. If the Mo content in the sheath is less than 8 percent by mass, it is necessary that Mo be added to the flux in order to obtain the strength of the weld metal, and the flux filling ratio becomes excessive. On the other hand, if the Mo content in the sheath is more than 22 percent by mass, the hot workability of the metal sheath is degraded and forming of the sheath becomes difficult. Therefore, the Mo content in the sheath is specified to be 8 to 22 percent by mass.

Ti: 0.002 to 0.40 percent by mass in sheath

Titanium in the sheath serves as a deoxidizing component and plays a role in reducing the amount of dissolved oxygen in the molten metal, suppressing the reaction "C+O=CO (gas)", and reducing the amount of generation of blowholes. If the Ti content in the sheath is less than 0.002 percent by mass, the effect is not obtained. On the other hand, if the Ti content in the sheath is more than 0.40 percent by mass, the hot workability of the metal sheath is degraded and forming of the sheath becomes difficult because of the influence of deposition of intermetallic compounds, e.g., $Ni_3Ti$. Therefore, the Ti content in the sheath is specified to be 0.002 to 0.40 percent by mass. The Ti content in the sheath is preferably 0.03 percent by mass or more and preferably 0.10 percent by mass or less.

Al: 0.03 to 0.40 percent by mass in sheath

Aluminum in the sheath serves as a deoxidizing component and play a role in reducing the amount of dissolved oxygen in the molten metal and reducing the amount of generation of blowholes as with Ti. If the Al content in the sheath is less than 0.03 percent by mass, the effect is not obtained. On the other hand, if the Al content in the sheath is more than 0.40 percent by mass, the hot workability of the metal sheath is degraded and forming of the sheath becomes difficult because of the influence of deposition of intermetallic compounds, e.g., $Ni_3Al$. Therefore, the Al content in the sheath is specified to be 0.03 to 0.40 percent by mass. The Al content in the sheath is preferably 0.06 percent by mass or more and preferably 0.10 percent by mass or less.

Mg: 0.004 to 0.025 percent by mass in sheath

Magnesium in the sheath serves as a deoxidizing component and play a role in reducing the amount of dissolved oxygen in the molten metal and reducing the amount of generation of blowholes as with Ti. If the Mg content in the sheath is less than 0.004 percent by mass, the effect is not obtained. On the other hand, if the Mg content in the sheath is more than 0.025 percent by mass, the amount of spatter increases during welding and the welding operability is degraded. Therefore, the Mg content in the sheath is specified to be 0.004 to 0.025 percent by mass. The Mg content in the sheath is preferably 0.010 percent by mass or more and preferably 0.020 percent by mass or less.

C: 0.020 percent by mass or less in sheath

Carbon in the sheath is present as an incidental impurity. Carbon in the sheath is bonded to O easily during welding and is converted to a CO gas, so as to cause generation of blowholes. Therefore, the C content in the sheath is specified to be 0.020 percent by mass or less, and more preferably, the C content in the sheath is 0.010 percent by mass or less.

Si: 0.15 percent by mass or less in sheath

Silicon in the sheath is present as an incidental impurity. Silicon in the sheath combines with Ni present as an incidental impurity to generate a low-melting point compound, so that the hot cracking resistance is degraded. Therefore, the Si content in the sheath is specified to be 0.15 percent by mass or less.

Remainder

The remainder of the components of the sheath may contain 4.0 percent by mass or less of Mn, 7.0 percent by mass or less of Fe, and 4.0 percent by mass or less of W. However, if Mn in the sheath is more than 4.0 percent by mass or W is more than 4.0 percent by mass, the hot workability of the metal sheath is degraded and forming of the sheath becomes difficult. Meanwhile, if Fe in the sheath is more than 7.0 percent by mass, the hot cracking resistance is degraded. The others are incidental impurities. Examples of incidental impurities include P, S, Cu, Nb, V, and N besides C and Si described above.

The reasons for the limitations of the component numerical values relative to the total mass of the wire will be described below.

Ni: 53 to 75 percent by mass relative to total mass of wire

Nickel is alloyed with various metals and imparts excellent mechanical performances and corrosion resistance to the weld metal. However, if the Ni content in the flux cored wire is less than 53 percent by mass relative to the total mass of the wire, stable austenite microstructure is not formed when the weld metal is diluted. On the other hand, if the Ni content in the flux cored wire is more than 75 percent by mass relative to the total mass of the wire, the amount of addition of the other alloy elements becomes insufficient, so that the mechanical performance is not ensured. Therefore, the Ni content is specified to be 53 to 75 percent by mass relative to the total mass of the wire. Examples of Ni sources of the flux cored wire according to the present invention include the Ni based alloy constituting the sheath and metal Ni and a Ni—Mo alloy contained in the flux. In the present invention, the contents of them are converted to the content of Ni, and the resulting value is taken as the Ni content.

Cr: 1 to 15 percent by mass relative to total mass of wire

Chromium has an effect of improving the corrosion resistance and the strength of the weld metal. However, if the Cr content in the flux cored wire is less than 1 percent by mass relative to the total mass of the wire, the effect is not obtained. On the other hand, if the Cr content in the flux cored wire is more than 15 percent by mass relative to the total mass of the wire, the hot cracking resistance is degraded. Therefore, the Cr content is specified to be 1 to 15 percent by mass relative to the total mass of the wire. Examples of Cr sources of the flux cored wire according to the present invention include the Ni based alloy constituting the sheath and metal Cr, an Fe—Cr alloy, and $Cr_2O_3$ contained in the flux. In the present invention, the contents of them are converted to the content of Cr, and the resulting value is taken as the Cr content.

Mo: 10 to 20 percent by mass relative to total mass of wire

Molybdenum has an effect of improving the corrosion resistance and the strength of the weld metal. However, if the Mo content in the flux cored wire is less than 10 percent by mass relative to the total mass of the wire, the corrosion resistance and the strength of the weld metal are not ensured. On the other hand, if the Mo content in the flux cored wire is more than 20 percent by mass relative to the total mass of the wire, the hot cracking resistance is degraded. Therefore, the Mo content is specified to be 10 to 20 percent by mass relative to the total mass of the wire. Examples of Mo sources of the flux cored wire according to the present invention include the Ni based alloy constituting the sheath and metal Mo and an Fe—Mo alloy contained in the flux. In the present invention, the contents of them are converted to the content of Mo, and the resulting value is taken as the Mo content.

Mn: 1.5 to 5.5 percent by mass relative to total mass of wire

Manganese has an effect of making S harmless by bonding to S which forms a low-melting point compound with Ni to degrade the hot cracking resistance. However, if the Mn content in the flux cored wire is less than 1.5 percent by mass relative to the total mass of the wire, the effect of making S harmless is not obtained. On the other hand, if the Mn content in the flux cored wire is more than 5.5 percent by mass relative to the total mass of the wire, the slag peeling property is degraded. Therefore, the Mn content is specified to be 1.5 to 5.5 percent by mass relative to the total mass of the wire. Examples of Mn sources of the flux cored wire according to the present invention include the Ni based alloy constituting the sheath and metal Mn and an Fe—Mn alloy contained in the flux. In the present invention, the contents of them are converted to the content of Mn, and the resulting value is taken as the Mn content.

W: 1.5 to 5.0 percent by mass relative to total mass of wire

Tungsten is a component to improve the strength of the weld metal. However, if the W content in the flux cored wire is less than 1.5 percent by mass relative to the total mass of the wire, the strength of the weld metal is not ensured. On the other hand, if the W content in the flux cored wire is more than 5.0 percent by mass relative to the total mass of the wire, the hot cracking resistance is degraded. Therefore, the W content is specified to be 1.5 to 5.0 percent by mass relative to the total mass of the wire. Examples of W sources of the flux cored wire according to the present invention include the Ni based alloy constituting the sheath and metal W and an Fe—W alloy contained in the flux. In the present invention, the contents of them are converted to the content of W, and the resulting value is taken as the W content.

Fe: 2.0 to 8.0 percent by mass relative to total mass of wire

Iron is added to ensure the ductility of the weld metal. If the Fe content in the flux cored wire is less than 2.0 percent by mass relative to the total mass of the wire, the ductility of the weld metal is not ensured. On the other hand, if the Fe content in the flux cored wire is more than 8.0 percent by mass relative to the total mass of the wire, the hot cracking resistance is degraded. Therefore, the Fe content is specified to be 2.0 to 8.0 percent by mass relative to the total mass of the wire. Examples of Fe sources of the flux cored wire according to the present invention include the Ni based alloy constituting the sheath and metal Fe, an Fe—Mn alloy, an Fe—Cr alloy, an Fe—Mo alloy, and an Fe—Ti alloy contained in the flux. In the present invention, the contents of them are converted to the content of Fe, and the resulting value is taken as the Fe content.

Ti: 0.002 to 0.50 percent by mass relative to total mass of wire

Titanium contained in the flux cored wire serves as a deoxidizing component and plays a role in reducing the amount of dissolved oxygen in the molten metal, suppressing the reaction "C+O=CO (gas)", and reducing the amount of generation of blowholes. If the Ti content in the flux cored wire is less than 0.002 percent by mass relative to the total mass of the wire, the effect is not obtained. On the other hand, if the Ti content in the flux cored wire is more than 0.50 percent by mass relative to the total mass of the wire, the hot cracking resistance of the weld metal is degraded. Therefore, the Ti content is specified to be 0.002 to 0.50 percent by mass relative to the total mass of the wire. Examples of Ti sources of the flux cored wire according to the present invention include the Ni based alloy constituting the sheath and metal Ti and an Fe—Ti alloy contained in the flux. In the present invention, the contents of them are converted to the content of Ti, and the resulting value is taken as the Ti content. In this regard, this Ti content is specified to be the content of Ti derived from metal Ti and Ti alloys soluble in sulfuric acid, where Ti derived from oxides, e.g., $TiO_2$, insoluble in sulfuric acid is not included.

Al: 0.02 to 0.50 percent by mass relative to total mass of wire

Aluminum contained in the flux cored wire serves as a deoxidizing component and plays a role in reducing the amount of dissolved oxygen in the molten metal and reducing the amount of generation of blowholes as with Ti. If the Al content in the flux cored wire is less than 0.02 percent by mass relative to the total mass of the wire, the effect is not obtained. On the other hand, if the Al content in the flux cored wire is more than 0.50 percent by mass relative to the total mass of the wire, the hot cracking resistance of the weld metal is degraded. Therefore, the Al content is specified to be 0.02 to 0.50 percent by mass relative to the total mass of the wire. Examples of Al sources of the flux cored wire according to the present invention include the Ni based alloy constituting the sheath and metal Al and an Fe—Al alloy contained in the flux. In the present invention, the contents of them are converted to the content of Al, and the resulting value is taken as the Al content. In this regard, this Al content is specified to be the content of Al derived from metal Al and Al alloys soluble in sulfuric acid, where Al derived from oxides, e.g., $Al_2O_3$, insoluble in sulfuric acid is not included.

Mg: 0.003 to 0.03 percent by mass relative to total mass of wire

Magnesium contained in the flux cored wire serves as a deoxidizing component and plays a role in reducing the amount of dissolved oxygen in the molten metal and reducing the amount of generation of blowholes as with Ti. If the Mg content in the flux cored wire is less than 0.003 percent by mass relative to the total mass of the wire, the effect is not obtained. On the other hand, if the Mg content in the flux cored wire is more than 0.03 percent by mass relative to the total mass of the wire, the amount of spatter increases during welding and the welding operability is degraded. Therefore, the Mg content is specified to be 0.003 to 0.03 percent by mass relative to the total mass of the wire. Examples of Mg sources of the flux cored wire according to the present invention include the Ni based alloy constituting the sheath and metal Mg and a Ni—Mg alloy contained in the flux. In the present invention, the contents of them are converted to the content of Mg, and the resulting value is taken as the Mg content. In this regard, this Mg content is specified to be the content of Mg derived from metal Mg and Mg alloys soluble in sulfuric acid, where Mg derived from oxides, e.g., MgO, insoluble in sulfuric acid is not included.

C: 0.050 percent by mass or less relative to total mass of wire

Carbon in the flux cored wire is an incidental impurity. If the C content in the flux cored wire is more than 0.050 percent by mass relative to the total mass of the wire, the amount of generation of blowholes mainly derived from a CO gas increases. Therefore, the C content is specified to be 0.050 percent by mass or less relative to the total mass of the wire. Examples of C sources of the flux cored wire according to the present invention include the Ni based alloy constituting the sheath and C as an incidental impurity contained in alloy components and a slag-forming agent in the flux.

Si: 0.20 percent by mass or less relative to total mass of wire

Silicon is an incidental impurity present in the flux cored wire. If the Si content in the flux cored wire is more than 0.20 percent by mass relative to the total mass of the wire, a low-melting point compound is generated by combination with Ni, so that the hot cracking resistance is degraded. Therefore, the Si content is specified to be 0.20 percent by mass or less relative to the total mass of the wire. In this regard, the Si content according to the present invention is specified to be the content of Si derived from metal Si and Si alloys soluble in hydrochloric acid and nitric acid, where Si derived from oxides, e.g., $SiO_2$, insoluble in acids is not included.

Nb: 0.030 percent by mass or less relative to total mass of wire

Niobium is an incidental impurity present in the flux cored wire. If the Nb content in the flux cored wire is more than 0.030 percent by mass relative to the total mass of the wire, a low-melting point compound is generated by combination with Ni, so that the hot cracking resistance is degraded. Therefore, the Nb content is specified to be 0.030 percent by mass or less relative to the total mass of the wire.

P: 0.015 percent by mass or less relative to total mass of wire, S: 0.010 percent by mass or less relative to total mass of wire Phosphorus and sulfur are incidental impurities present in the flux cored wire. If the P content in the flux cored wire is more than 0.015 percent by mass relative to the total mass of the wire or the S content is more than 0.010 percent by mass relative to the total mass of the wire, low-melting point compounds of these elements and Ni are generated, so that the hot cracking resistance is degraded. Therefore, the P content is specified to be 0.015 percent by mass or less relative to the total mass of the wire and the S content is specified to be 0.010 percent by mass or less relative to the total mass of the wire.

Remainder: Incidental Impurities

The remainder of the components in the whole flux cored wire are incidental impurities. Examples of incidental impurities include Cu, V, and N besides C, Si, Nb, P, and S described above.

Also, besides the above-described wire components, small amounts of Ca, Li, and the like, which are wire components serving as fine conditioning agents of deoxidation and the like, may be contained in the flux.

The reasons for the limitations of the other numerical values will be described below.

Figure 1:
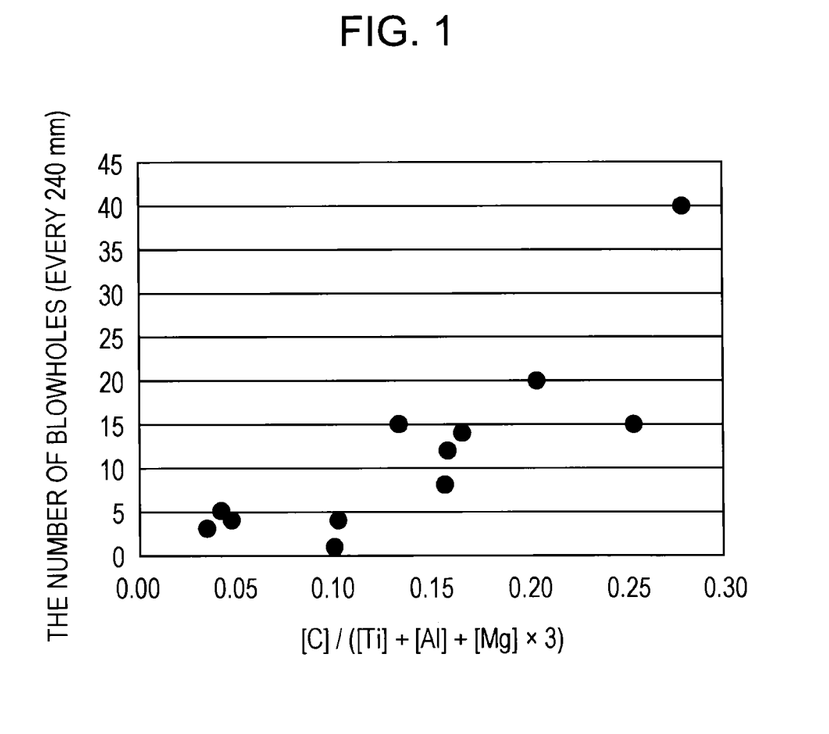
FIG. 1 is a graph showing the relationship between the sheath components and the number of generation of blowholes.

Ratio calculated by [C]/([Ti]+[Al]+[Mg]×3) of 0.11 or less, where percent by mass of C, Ti, Al, and Mg in sheath are represented by [C], [Ti], [Al], and [Mg], respectively Carbon in the sheath is an element serving as a generation source of CO gas blowholes. On the other hand, Ti, Al, and Mg are components serving as deoxidizing agents effective in suppressing generation of blowholes. The present inventors found that in the Ni based alloy flux cored wire, the ratio calculated by [C]/([Ti]+[Al]+[Mg]×3), where percent by mass of C, Ti, Al, and Mg contained in the sheath are represented by [C], [Ti], [Al], and [Mg], respectively, was closely pertinent to the amount of generation of blowholes (refer to FIG. 1). That is, if this ratio exceeds 0.11, blowholes increase sharply. Therefore, it is preferable that the C, Ti, Al, and Mg contents in the above-described sheath and the C content in the whole wire be specified and, in addition, the ratio calculated by [C]/([Ti]+[Al]+[Mg]×3) is specified to be 0.11 or less. More preferably, the ratio calculated by [C]/([Ti]+[Al]+[Mg]×3) is 0.05 or less. In this regard, the above-described formula was derived on the basis of experiments.

Sum total of at least two types selected from group consisting of $TiO_2$, $SiO_2$, and $ZrO_2$: 3 to 15 percent by mass relative to total mass of wire Titanium oxide ($TiO_2$) forms a homogeneous slag having good encapsulation property, has an effect of improving the arc stability and, therefore, is added as a primary component of a slag-forming agent. Examples of $TiO_2$ sources include rutile, leucoxene, potassium titanate, sodium titanate, and calcium titanate. Silicon oxide ($SiO_2$) is added as a slag-forming agent to increase the viscosity of the slag and obtain a good bead shape as with $TiO_2$. Examples of raw materials for $SiO_2$ include silica sand, potassium feldspar, wollastonite, sodium silicate, and potassium silicate. Zirconium oxide ($ZrO_2$) has functions of improving the arc strength and improving the arc stability even in a low welding current region. Also, functions of accelerating solidification of the slag and improving the welding operability in vertical upward welding are performed. Therefore, $ZrO_2$ is added as a slag-forming agent. Examples of $ZrO_2$ sources include zircon sand and zirconia.

If the sum total of at least two types selected from the group consisting of $TiO_2$, $SiO_2$, and $ZrO_2$ in the enveloped flux is less than 3 percent by mass relative to the total mass of the wire, the characteristics of them serving as the slag-forming agents are not exerted sufficiently. On the other hand, if the sum total is more than 15 percent by mass, slag components in the wire become excessive, the amount of generation of slag during welding becomes excessive, the slag droops and drops from the weld zone easily, and slag inclusions occur easily in the weld zone. Therefore, in the present invention, the sum total of at least two types selected from the group consisting of $TiO_2$, $SiO_2$, and $ZrO_2$ in the enveloped flux is specified to be 3 to 15 percent by mass relative to the total mass of the wire.

Sum total of compounds of Na, K, and Li (sum total in terms of Na, K, and Li simple substances): 0.1 to 1.0 percent by mass relative to total mass of wire.

In the flux, Na, K, and Li function as arc stabilizers and suppress generation of spatters. In the present invention, Na, K, and Li are added as Na compounds, K compounds, and Li compounds, respectively. Specifically, for example, LiF, NaF, KF, $Na_3AlF_6$, $K_2SiF_6$, $K_2TiF_6$, albite, potassium feldspar, and the like may be used. If the content of Na compounds, K compounds, and Li compounds in the flux is less than 0.1 percent by mass in terms of the sum total of Na, K, and Li, respectively, relative to the total mass of the wire, the function as the arc stabilizer is not obtained sufficiently, and the pit resistance is degraded. On the other hand, if the content of Na compounds, K compounds, and Li compounds in the flux is more than 1.0 percent by mass relative to the total mass of the wire, the amount of generation of spatters increases conversely. Therefore, in the present invention, the sum total of compounds, e.g., fluorides and oxides, of Na, K, and Li in the enveloped flux is specified to be 0.1 to 1.0 percent by mass in terms of Na, K, and Li simple substances relative to the total mass of the wire.

In this regard, the remainder of the flux are Mn, W, Fe, and incidental impurities.

The above-described flux cored wire according to the present invention may be favorably used in, for example, gas-shielded metal arc welding by using an $Ar+CO_2$ mixed gas in welding of low temperature service steels, e.g., a 9% Ni steel and various high Ni alloys.

EXAMPLES

The examples according to the present invention will be described below in comparison with the comparative examples out of the scope of the present invention.

Cylindrical sheaths (Nos. A to L) were produced by bending bands which were made from Ni based alloys having the compositions shown in Table 1 below and which had a thickness of 0.4 mm and a width of 9.0 mm. Fluxes composed of metal raw materials and slag components (Nos. I to III) shown in Table 2 below were enveloped in these sheaths to produce flux cored wires (Nos. 1 to 15) having compositions shown in Table 3 below. The resulting wires were drawn in such a way that the diameter became 1.2 mm and, thereafter, the moisture content in the wire was reduced to 400 ppm or less through electric heating. The resulting wires were specified to be test wires.

TABLE 1

| Sheath component (percent by mass) (remainder: incidental impurities) | | | | | | | | | | | | | |
|---|---|---|---|---|---|---|---|---|---|---|---|---|---|
| Sheath No. | C | Si | Mn | P | S | Ni | Cr | Mo | Fe | W | Al | Ti | Mg | [C]/([Ti] + [Al] + [Mg] × 3) |
| A | 0.004 | 0.10 | 2.4 | 0.005 | 0.0002 | 64 | 8.1 | 16.6 | 5.8 | 2.3 | 0.074 | 0.002 | 0.0130 | 0.03 |
| B | 0.003 | 0.05 | 2.4 | 0.009 | 0.0002 | 66 | 8.0 | 16.0 | 4.6 | 2.3 | 0.043 | 0.006 | 0.0073 | 0.04 |
| C | 0.003 | 0.05 | 2.2 | 0.009 | 0.0002 | 67 | 7.8 | 15.4 | 4.5 | 2.2 | 0.041 | 0.002 | 0.0066 | 0.05 |
| D | 0.014 | 0.01 | 0.1 | <0.002 | 0.0006 | 69 | 2.2 | 18.8 | 5.8 | 3.1 | 0.069 | 0.049 | 0.0069 | 0.10 |
| E | 0.017 | 0.05 | 0.1 | <0.002 | 0.0009 | 69 | 2.2 | 19.2 | 5.8 | 3.1 | 0.065 | 0.046 | 0.0180 | 0.10 |
| F | 0.018 | 0.02 | 0.1 | <0.002 | 0.0007 | 70 | 2.1 | 18.8 | 5.8 | 2.9 | 0.053 | 0.061 | 0.0068 | 0.13 |
| G | 0.011 | 0.01 | 0.1 | <0.002 | 0.0010 | 70 | 2.0 | 19.0 | 5.8 | 2.9 | 0.017 | 0.045 | 0.0027 | 0.16 |
| H | 0.022 | 0.01 | 0.1 | <0.002 | 0.0002 | 69 | 2.2 | 18.8 | 5.8 | 3.1 | 0.053 | 0.064 | 0.0073 | 0.16 |
| I | 0.025 | 0.05 | 0.1 | <0.002 | 0.0002 | 69 | 2.2 | 19.2 | 5.7 | 3.0 | 0.038 | 0.056 | 0.0190 | 0.17 |
| J | 0.006 | 0.03 | 2.2 | 0.009 | 0.0006 | 66 | 8.2 | 15.7 | 4.9 | 2.3 | 0.017 | 0.002 | 0.0035 | 0.20 |
| K | 0.023 | 0.07 | 0.1 | <0.002 | 0.0002 | 69 | 2.2 | 19.2 | 5.7 | 3.2 | 0.021 | 0.040 | 0.0099 | 0.25 |
| L | 0.017 | 0.14 | 2.4 | 0.005 | 0.0001 | 63 | 8.1 | 16.2 | 5.6 | 2.5 | 0.048 | 0.003 | 0.0034 | 0.28 |

TABLE 2

| | Slag component relative to total mass of wire (percent by mass) | | | | | | | |
|---|---|---|---|---|---|---|---|---|
| Slag component No. | $TiO_2$ | $SiO_2$ | $ZrO_2$ | $TiO_2$ + $SiO_2$ + $ZrO_2$ | $K_2SiF_6$ | NaF | LiF | Na, K, and Li Sum total of values converted from compounds |
| I | 6.5 | 0.8 | 2.1 | 9.4 | 0.3 | 0.3 | 0.1 | 0.3 |
| II | 7.0 | 0.7 | 4.0 | 11.7 | 0.2 | 0.3 | 0.1 | 0.3 |
| III | 7.1 | 0.9 | 1.4 | 9.4 | 0.4 | 0.3 | 0.1 | 0.3 |

TABLE 3

| | Wire No. | Sheath No. | Slag No. | Metal component in wire (relative to total mass of wire, percent by mass) (remainder: incidental impurities) | | | | | | | | | | | | |
|---|---|---|---|---|---|---|---|---|---|---|---|---|---|---|---|---|
| | | | | C | Si | Mn | P | S | Ni | Cr | Mo | Fe | W | Nb | Al | Ti | Mg |
| Example | 1 | A | I | 0.024 | 0.12 | 3.4 | 0.007 | 0.004 | 55.0 | 6.1 | 16.2 | 6.6 | 2.1 | 0 | 0.06 | 0.10 | 0.010 |
| | 2 | A | II | 0.024 | 0.13 | 3.4 | 0.007 | 0.004 | 53.1 | 6.1 | 16.1 | 6.3 | 2.0 | 0 | 0.06 | 0.10 | 0.010 |
| | 3 | A | III | 0.025 | 0.13 | 3.4 | 0.007 | 0.004 | 55.3 | 6.2 | 16.0 | 6.5 | 2.1 | 0 | 0.06 | 0.10 | 0.010 |
| | 4 | B | I | 0.024 | 0.09 | 3.5 | 0.010 | 0.004 | 56.8 | 6.2 | 15.5 | 5.6 | 2.2 | 0 | 0.03 | 0.10 | 0.006 |
| | 5 | C | I | 0.024 | 0.09 | 3.3 | 0.010 | 0.004 | 57.5 | 6.0 | 15.0 | 5.5 | 2.0 | 0 | 0.03 | 0.10 | 0.005 |
| | 6 | D | I | 0.033 | 0.06 | 3.5 | 0.005 | 0.004 | 57.2 | 5.7 | 15.1 | 5.4 | 2.4 | 0 | 0.05 | 0.04 | 0.005 |
| | 7 | E | I | 0.035 | 0.09 | 3.5 | 0.005 | 0.005 | 56.9 | 5.8 | 15.4 | 5.4 | 2.4 | 0 | 0.05 | 0.04 | 0.014 |
| | 8 | F | I | 0.036 | 0.06 | 3.5 | 0.005 | 0.004 | 57.5 | 5.7 | 15.0 | 5.4 | 2.3 | 0 | 0.04 | 0.05 | 0.005 |
| Comparative example | 9 | G | I | 0.030 | 0.06 | 3.5 | 0.005 | 0.005 | 57.4 | 5.6 | 15.2 | 5.3 | 2.3 | 0 | 0.01 | 0.03 | 0.002 |
| | 10 | H | I | 0.039 | 0.06 | 3.5 | 0.005 | 0.004 | 57.0 | 5.7 | 15.1 | 5.4 | 2.4 | 0 | 0.04 | 0.05 | 0.006 |
| | 11 | I | I | 0.041 | 0.09 | 3.5 | 0.005 | 0.004 | 57.0 | 5.8 | 15.4 | 5.3 | 2.3 | 0 | 0.03 | 0.04 | 0.015 |
| | 12 | J | I | 0.026 | 0.07 | 3.3 | 0.010 | 0.004 | 56.5 | 6.3 | 15.2 | 5.8 | 2.1 | 0 | 0.01 | 0.10 | 0.003 |
| | 13 | K | I | 0.040 | 0.10 | 3.5 | 0.005 | 0.004 | 56.8 | 5.8 | 15.4 | 5.3 | 2.4 | 0 | 0.02 | 0.03 | 0.008 |
| | 14 | L | I | 0.035 | 0.16 | 3.5 | 0.007 | 0.004 | 55.2 | 6.2 | 15.6 | 6.3 | 2.3 | 0 | 0.04 | 0.10 | 0.003 |
| | 15 | A | I | 0.051 | 0.12 | 3.5 | 0.007 | 0.004 | 55.6 | 5.9 | 16.2 | 5.6 | 2.1 | 0 | 0.06 | 0.10 | 0.010 |

Vertical butt welding was performed by using the flux cored wire of Nos. 1 to 15 produced by the above-described method, and the arc stability during welding, the spatter suppression performance during welding, the bead appearance of weld zone, and the blowhole resistance were evaluated. The evaluation criteria were as described below.

Figure 2:
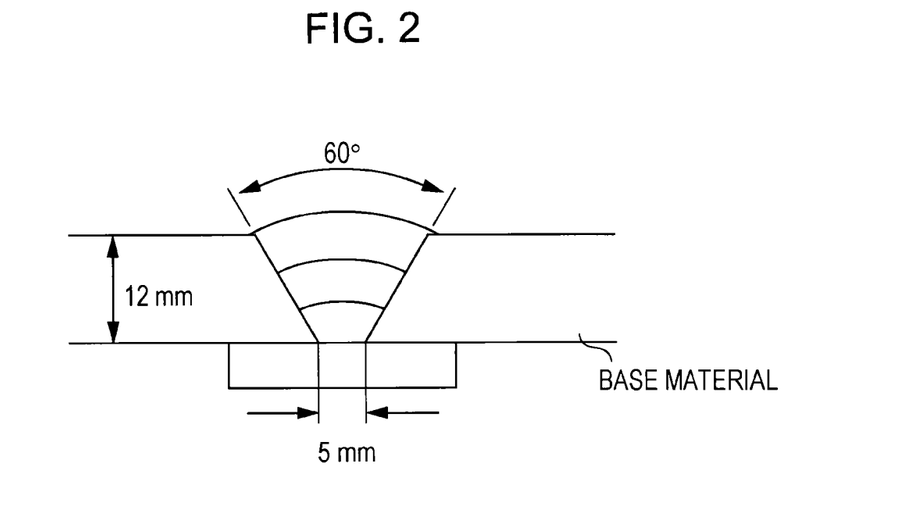
FIG. 2 is a schematic diagram showing the groove shape and the stacking procedure of a butt weld joint in vertical butt welding in an example.

As for the welding, a 9% Ni steel sheet which is shown in Table 4 and which had a sheet thickness of 12 mm, a width of 250 mm, and a length of 300 mm was used. A base material having a groove angle of 60°, a root gap of 5 mm, and a backing metal, as shown in FIG. 2, was subjected to partly mechanized welding, where three-layer three-pass vertical upward welding was performed. As for the welding condition at that time, the welding current was 160 A (direct current wire plus), the arc voltage was 26 V, 80% Ar-20% $CO_2$ was used as the shield gas, the flow rate of shield gas was 25 L/min, and the welding speed was 11 to 15 cm/min.

TABLE 4

| C | Si | Mn | P | S | Ni | Fe |
|---|---|---|---|---|---|---|
| 0.05 | 0.22 | 0.64 | 0.002 | 0.001 | 9.22 | remainder |

*Others are incidental impurities

The evaluation criteria were as described below.

As for the evaluation result of each of the arc stability during welding, the spatter suppression performance during welding, and the bead appearance of weld zone, the case of very good was indicated by ⊙, the case of good was indicated by ○, the case of slightly poor was indicated by Δ, and the case of poor was indicated by ×.

The blowhole resistance was evaluated by the number of spherical defects of 0.4 mm or more (that is, the number of blowholes) detected on the basis of a radiographic testing after an excess weld metal and the backing metal was removed. At this time, start and end portions of the weld bead, that is, portions from start and end points to points at 30 mm from the start and end points, were specified to be out of the evaluation region. The case where the number of generation of blowholes every 240 mm of bead length was 5 or more was indicated by ⊙, the case of 6 to 10 was indicated by ○, the case of 11 to 15 was indicated by Δ, and the case of 16 or more was indicated by ×.

These results are shown in Table 5.

TABLE 5

| | Wire No. | Arc stability | Spatter suppression performance | Bead appearance | Blowhole resistance |
|---|---|---|---|---|---|
| Example | 1 | ⊙ | ⊙ | ⊙ | ⊙ |
| | 2 | ⊙ | ⊙ | ⊙ | ⊙ |
| | 3 | ⊙ | ⊙ | ⊙ | ⊙ |
| | 4 | ⊙ | ⊙ | ⊙ | ⊙ |
| | 5 | ⊙ | ⊙ | ⊙ | ⊙ |
| | 6 | ⊙ | ⊙ | ⊙ | ○ |
| | 7 | ⊙ | ⊙ | ⊙ | ○ |
| | 8 | ⊙ | ⊙ | ⊙ | ○ |
| Comparative example | 9 | ⊙ | ⊙ | ⊙ | Δ |
| | 10 | ⊙ | ⊙ | ⊙ | Δ |
| | 11 | ⊙ | ⊙ | ⊙ | Δ |
| | 12 | ⊙ | ⊙ | ⊙ | × |
| | 13 | ⊙ | ⊙ | ⊙ | × |
| | 14 | ⊙ | ⊙ | ⊙ | × |
| | 15 | ⊙ | ⊙ | ⊙ | × |

As shown in Table 5, Example Nos. 1 to 8 which satisfied the scope of the present invention exhibited good arc stability, spatter suppression performance, and bead appearance in the vertical upward welding, and the blowhole resistance of the weld zone was also good.

Among Nos. 1 to 8 which were examples satisfying the scope of the present invention, Nos. 1 to 5 were examples in which the ratio calculated by [C]/([Ti]+[Al]+[Mg]×3) on the basis of the chemical components of the sheath satisfied a more preferable specification, and excellent blowhole resistance was obtained as compared with that in Nos. 6 to 8.

In Example No. 8, the amounts of C, Al, Ti, and Mg in the sheath satisfied the scope of the present invention, but the ratio calculated by [C]/([Ti]+[Al]+[Mg]×3) was more than 0.11. Therefore, the blowhole resistance was excellent, although the number of generation of blowholes in No. 8 was 10, while the number of generation of blowholes in Nos. 6 and 7 were 6 to 7, so that the blowhole resistance was slightly poor as compared with that in Nos. 6 and 7.

Comparative example Nos. 9 to 15 exhibited good vertical upward welding operability, but the blowhole resistance was insufficient. In No. 9, the Al and Mg contents in the sheath and relative to total mass of the wire were lower than the scope of the present invention, so that the blowhole resistance was degraded.

In No. 10 and No. 11, the Al, Ti, and Mg contents in the sheath were within the scope of the present invention, but the C content in the sheath was higher than the scope of the present invention, so that the blowhole resistance was degraded. In No. 12, the Al contents in the sheath and relative to total mass of the wire were lower than the scope of the present invention, so that the blowhole resistance was degraded.

In No. 13, the C content in the sheath was higher than the scope of the present invention and the Al content in the sheath was lower than the scope of the present invention, so that the blowhole resistance was degraded.

In No. 14, the Mg content in the sheath was lower than the scope of the present invention, so that the blowhole resistance was degraded. In No. 15, the C, Al, and Ti contents in the sheath were within the scope of the present invention, but the C content relative to total mass of the wire was more than 0.050 percent by mass, so that the blowhole resistance was degraded.

Up to this point, the present invention have been explained in detail with reference to the embodiments and examples. However, the gist of the present invention is not limited to the above-described contents and the scope of right is to be broadly interpreted on the basis of the claims. As a matter of course, various changes, modifications, and the like of the contents of the present invention can be made on the basis of the above description.

What is claimed is:

1. A Ni based alloy flux cored wire, comprising: a sheath and flux, wherein the sheath comprises, relative to a total mass of the sheath:
   Ni: 60 to 80 percent by mass,
   Cr: 1 to 15 percent by mass,
   Mo: 8 to 22 percent by mass,
   Ti: 0.002 to 0.40 percent by mass,
   Al: 0.03 to 0.40 percent by mass,
   Mg: 0.010 to 0.025 percent by mass,
   C: 0.020 percent by mass or less, and Si: 0.15 percent by mass or less, and wherein the wire comprises, relative to a total mass of the sheath and the flux:
   Ni: 53 to 75 percent by mass,
   Cr: 1 to 15 percent by mass,
   Mo: 10 to 20 percent by mass,
   Mn: 1.5 to 5.5 percent by mass,
   W: 1.5 to 5.0 percent by mass,
   Fe: 2.0 to 8.0 percent by mass,
   Ti: 0.002 to 0.50 percent by mass,
   Al: 0.02 to 0.50 percent by mass,
   Mg: 0.003 to 0.03 percent by mass,
   C: 0.050 percent by mass or less,
   Si: 0.20 percent by mass or less,
   Nb: 0.030 percent by mass or less,
   P: 0.015 percent by mass or less, and S: 0.010 percent by mass or less,
and wherein the Ni based alloy flux cored wire reduces occurrence of blowholes in a weld zone, without impairing welding operability.

2. The Ni based alloy flux cored wire according to claim 1, wherein a ratio calculated by [C]/([Ti]+[Al]+[Mg]×3) is 0.11 or less, where percent by mass of C, Ti, Al, and Mg contained in the sheath are represented by [C], [Ti], [Al], and [Mg], respectively.

3. The Ni based alloy flux cored wire according to claim 1,
   wherein the flux enveloped in the sheath comprises
   a sum total of at least two members selected from the group consisting of $TiO_2$, $SiO_2$, and $ZrO_2$: 3 to 15 percent by mass, and
   a sum total of compounds of Na, K, and Li, in terms of Na, K, and Li simple substances: 0.1 to 1.0 percent by mass, relative to the total mass of the wire.

4. The Ni based alloy flux cored wire according to claim 1, wherein the sheath comprises, relative to the total mass of the sheath, 0.03 to 0.10 percent by mass of Ti.

5. The Ni based alloy flux cored wire according to claim 1, wherein the sheath comprises, relative to the total mass of the sheath, 0.06 to 0.10 percent by mass of Al.

6. The Ni based alloy flux cored wire according to claim 1, wherein the sheath comprises, relative to the total mass of the sheath, 0.010 to 0.020 percent by mass of Mg.

7. The Ni based alloy flux cored wire according to claim 1, wherein the sheath comprises, relative to the total mass of the sheath, 0.010 percent by mass of C or less.

8. The Ni based alloy flux cored wire according to claim 1, wherein the sheath comprises, relative to the total mass of the sheath, greater than 0.010 to 0.020 percent by mass of Mg.

9. The Ni based alloy flux cored wire according to claim 1, wherein the sheath comprises, relative to the total mass of the sheath, 0.013 to 0.020 percent by mass of Mg.

10. The Ni based alloy flux cored wire according to claim 2,
    wherein the flux enveloped in the sheath comprises
    a sum total of at least two members selected from the group consisting of $TiO_2$, $SiO_2$, and $ZrO_2$: 3 to 15 percent by mass, and
    a sum total of compounds of Na, K, and Li, in terms of Na, K, and Li simple substances: 0.1 to 1.0 percent by mass, relative to the total mass of the wire.

11. The Ni based alloy flux cored wire according to claim 2, wherein the ratio is 0.05 or less.

* * * * *